(12) United States Patent
Suzuki et al.

(10) Patent No.: US 8,750,495 B2
(45) Date of Patent: Jun. 10, 2014

(54) TELEPHONE APPARATUS

(75) Inventors: Daiichiro Suzuki, Fukuoka (JP);
Mitsuhiro Haraguchi, Fukuoka (JP);
Toshiya Sakai, Fukuoka (JP);
Katsuhiko Uto, Fukuoka (JP); Tohru Sakata, Fukuoka (JP)

(73) Assignee: Panasonic Corporation, Osaka (JP)

( * ) Notice: Subject to any disclaimer, the term of this patent is extended or adjusted under 35 U.S.C. 154(b) by 45 days.

(21) Appl. No.: 13/393,512

(22) PCT Filed: Aug. 31, 2010

(86) PCT No.: PCT/JP2010/005353
§ 371 (c)(1),
(2), (4) Date: May 14, 2012

(87) PCT Pub. No.: WO2011/027541
PCT Pub. Date: Mar. 10, 2011

(65) Prior Publication Data
US 2012/0219147 A1 Aug. 30, 2012

(30) Foreign Application Priority Data
Sep. 1, 2009 (JP) ................................ 2009-201511

(51) Int. Cl.
*H04M 1/00* (2006.01)

(52) U.S. Cl.
USPC ........... 379/435; 248/126; 248/676; 248/677; 248/673; 248/688; 379/436; 379/446; 379/447; 379/449; 379/455; 224/197; 455/90.1; 455/90.3; 455/575.1

(58) Field of Classification Search
USPC ......... 379/435, 436, 446, 447, 449, 454, 455; 224/197; 455/90.1, 90.3, 575.1
See application file for complete search history.

(56) References Cited

U.S. PATENT DOCUMENTS

| 6,108,568 | A | * | 8/2000 | Lebrun et al. | 455/573 |
|---|---|---|---|---|---|
| 6,130,521 | A | * | 10/2000 | Collins et al. | 320/115 |
| 6,219,533 | B1 | * | 4/2001 | Richez | 455/575.6 |
| 6,386,502 | B1 | * | 5/2002 | Yamagishi | 248/685 |
| 2007/0235626 | A1 | * | 10/2007 | Mamizuka et al. | 248/677 |
| 2009/0026339 | A1 | * | 1/2009 | Chen | 248/349.1 |

FOREIGN PATENT DOCUMENTS

| JP | 11-205427 | 7/1999 |
|---|---|---|
| JP | 2001-274885 | 10/2001 |

OTHER PUBLICATIONS

International Search Report dated Sep. 28, 2010.

* cited by examiner

Primary Examiner — Curtis Kuntz
Assistant Examiner — Thomas Maung
(74) Attorney, Agent, or Firm — Seed IP Law Group PLLC (57) ABSTRACT

A telephone apparatus includes a phone body and an earpiece that is removably placed upright in the phone body. A supporting leg having a mounting surface that contacts a desk in a desk mount mode and that contacts a wall in a wall mount mode is provided on a sloped back side of the phone body so as to be turnable around a pivot. When the supporting leg is in a first turn position, a lower end of the slope of the phone body is substantially parallel to the mounting surface. When the supporting leg is in a second turn position after having turned through about 180 degrees from the first turn position, an upper end of the slope of the phone body becomes substantially parallel to the mounting surface.

9 Claims, 10 Drawing Sheets

FIG. 11

TELEPHONE APPARATUS

TECHNICAL FIELD

The present invention relates to a telephone apparatus that enables selection of a desk mount position or a wall mount position.

BACKGROUND ART

The hitherto telephone apparatus of this type has the following configuration.

Specifically, the telephone apparatus includes a phone body that is mounted at an inclination and that has a cradle port formed in a sloped front side of the phone body and a supporting leg mounting section provided on a sloped back side of the same, an earpiece removably placed in the cradle port of the phone body, and a supporting leg provided on the supporting leg mounting section of the phone body so as to be turnable around a pivot.

The supporting leg has a fitting surface that turns around the pivot while facing the sloped back side of the phone body; a first mounting surface for bringing the fitting surface into contact with a desk during desk mount turning action; and a second mounting surface for bringing the fitting surface into contact with a wall during a wall mount turning action achieved after a turn of about 180 degrees from the position of desk mount turning action (e.g., Patent Document 1).

Specifically, in order to switch a position from the desk mount position to the wall mount position or from the wall mount position to the desk mount position, the supporting leg is turned around the pivot. During a desk mount mode, the first mounting surface of the supporting leg is brought into contact with the desk. During a wall mount mode, the second mounting surface is brought into contact with the wall.

RELATED ART DOCUMENT

Patent Document

Patent Document 1: JP-A-11-205427

SUMMARY OF THE INVENTION

Problem that the Invention is to Solve

The problem of the example of the related art lies in that difficulty is encountered in picking up the earpiece from the cradle port of the phone body, to thus provide poor usability.

Specifically, in the example of the related art, the first mounting surface of the supporting leg is brought into contact with the desk during the desk mount mode. Further, during the wall mount mode, the second mounting surface is brought into contact with the wall. Hence, the inclination of the cradle port of the phone body greatly changes from the desk mount mode to the wall mount mode.

When the inclination of the cradle port of the phone body greatly changes, the earpiece may inadvertently drop off from the cradle port in either the desk mount mode or the wall mount mode. For this reason, the earpiece is laid on the cradle port in both the desk mount mode and the wall mount mode.

Therefore, difficulty is encountered in picking up the earpiece from the cradle port of the phone body, to thus provide poor usability.

Accordingly, the present invention aims at enhancing operability of a telephone apparatus.

Means for Solving the Problem in order to accomplish the object, the present invention provides a telephone apparatus comprising:

a phone body that is mounted at an inclination and that has a cradle port formed in a sloped front side of the phone body and a supporting leg mounting section on a sloped back side of the phone body; an earpiece removably placed upright in the cradle port of the phone body; and a supporting leg provided on the supporting leg mounting section so as to be turnable around a pivot, wherein the supporting leg has a fitting surface that turns around the pivot while facing the sloped back side of the phone body and a mounting surface that becomes substantially parallel to a lower end face of a slope of the phone body when the supporting leg is in a first turn position and that become substantially parallel to an upper end face of the slope of the phone body when the supporting leg is in a second turn position achieved after a turn of about 180 degrees from the first turn position. The object is thus accomplished.

Advantage of the Invention

As mentioned above, in the present invention, the telephone apparatus includes the phone body that is mounted at an inclination and that has the cradle port formed in the sloped front side of the phone body and the supporting leg mounting section provided on the sloped back side of the same, the earpiece removably placed upright in the cradle port of the phone body, and the supporting leg provided on the supporting leg mounting section of the phone body so as to be turnable around the pivot. The supporting leg has a mounting surface at such a location where the mounting surface becomes substantially parallel to the lower end face of the slope of the phone body when the supporting leg is in the first turn position and become substantially parallel to the upper end face of the slope of the phone body when the supporting leg is in the second turn position achieved after a turn of about 180 degrees from the first turn position. Accordingly, superior ease of use is provided.

Specifically, in the present invention, the supporting leg is turnable on the sloped back side of the phone body. The mounting surface of the supporting leg becomes substantially parallel to the lower end face of the slope of the phone body when the supporting leg is in the first turn position comes into contact with the desk, whereby the telephone apparatus enters a stable desk mount mode. In the second turn position achieved after a turn of about 180 degrees from the first turn position, the mounting surface of the supporting leg becomes substantially parallel to the upper end of the slope of the phone body, thereby contacting the wall. A stable wall mount mode can thus be implemented. Therefore, switching between the desk mount mode and the wall mount mode can simply be performed by merely turning the supporting leg. Further, the cradle port of the phone body becomes stable regardless of whether the telephone apparatus is in the desk mount mode or the wall mount mode. Therefore, the earpiece can be placed upright in the cradle port of the phone body, as a result of which ease of use of the telephone apparatus becomes improved.

EMBODIMENT FOR IMPLEMENTING THE INVENTION

An embodiment of the present invention is hereunder described by reference to the accompanying drawings.

Figure 1:
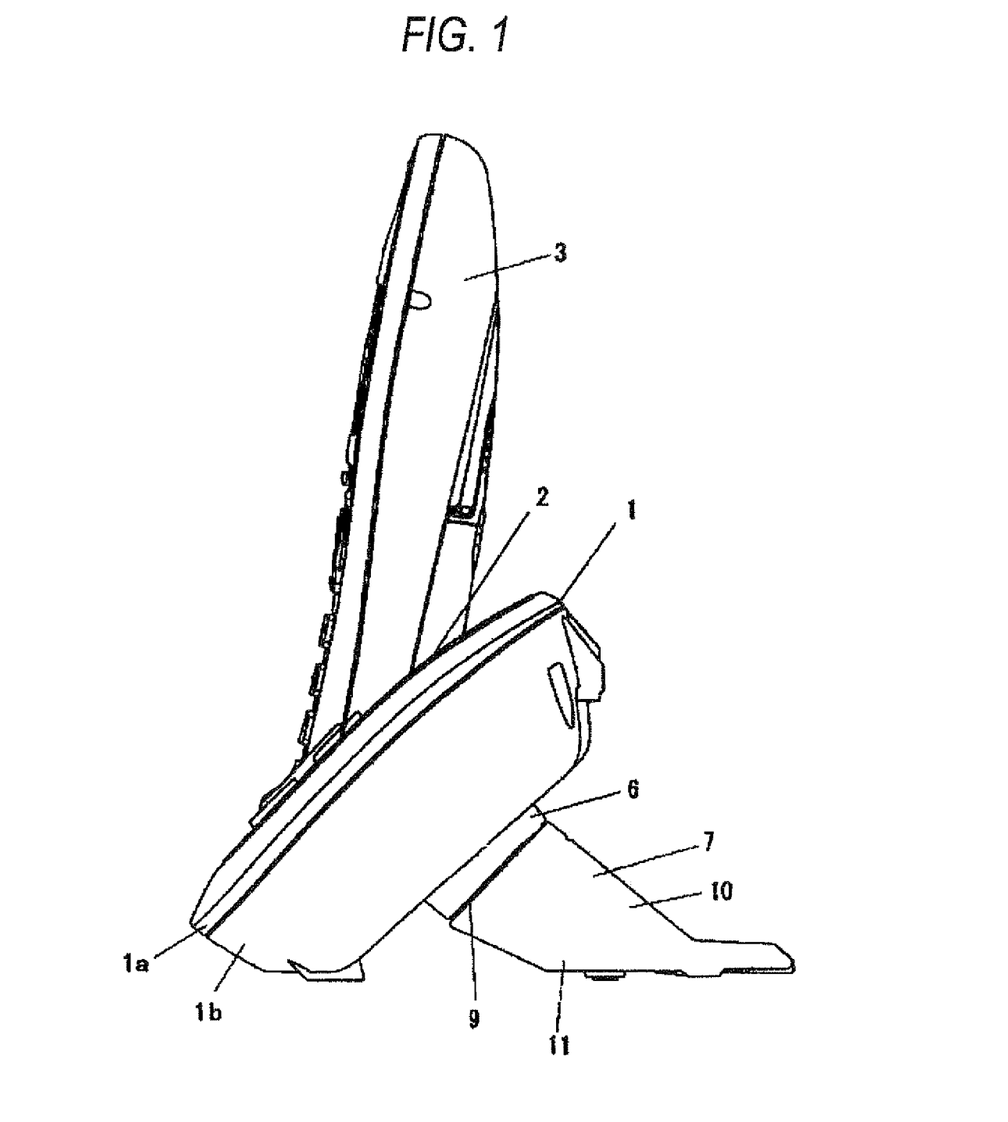
FIG. 1 is a side view of a telephone apparatus of an embodiment of the present invention.
Figure 2:
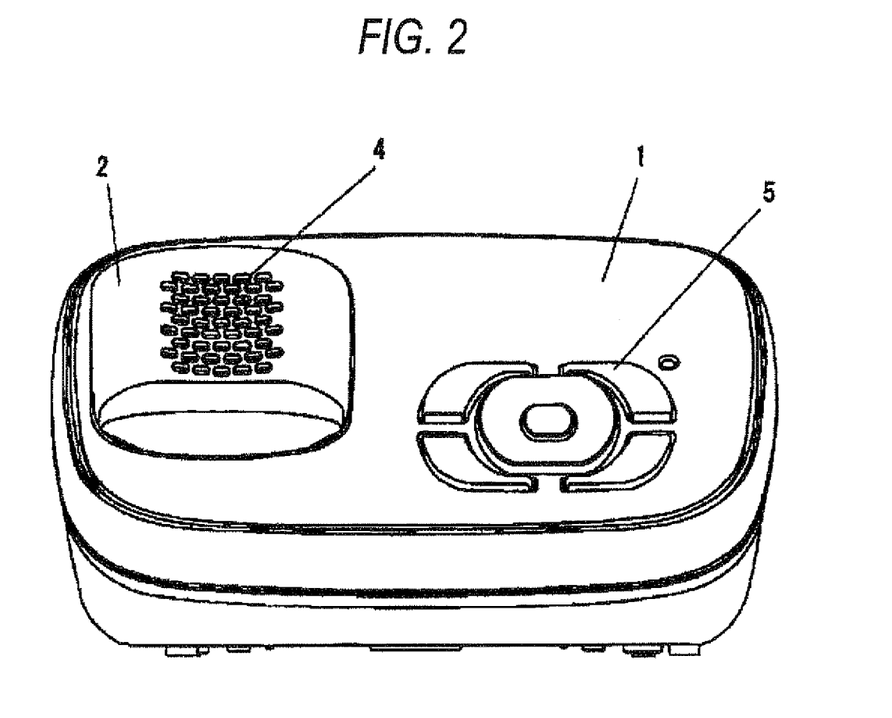
FIG. 2 is a front view of a phone body achieved when the telephone apparatus is mounted on a desk.

In FIG. 1, reference numeral 1 designates a phone body, and the phone body 1 assumes a box-shaped form assembled from an upper cabinet 1a and a lower cabinet 1b. By means of a supporting leg 7 attached to the lower cabinet 1b of the phone body 1, the phone body 1 is mounted in an inclined position when mounted on a desk. As shown in FIG. 2, a recessed cradle port 2 is formed in a sloped front side of the phone body 1. As shown in FIG. 1, a cordless earpiece 3 can removably be placed upright, and a secondary battery in the earpiece 3 can be charged in this state. Specifically, a lower portion of the earpiece 3 is removably fitted into the cradle port 2 of the phone body 1.

As shown in FIG. 2, a speaker grill 4 for emitting a ringtone and reproducing a recorded message is formed in an interior wall surface of the cradle port 2. Further, an operation section 5 used for reproducing a recorded message is provided beside the cradle port 2 on the upper cabinet 1a; namely, a sloped front side, of the phone body 1. A supporting leg mounting section 6 is provided on the lower cabinet 1b of the phone body 1; namely, a sloped back side of the phone body 1. The supporting leg 7 is provided on the supporting leg mount section 6 so as to be turnable around a pivot 8 shown in FIGS. 3 and 6.

Figure 10:
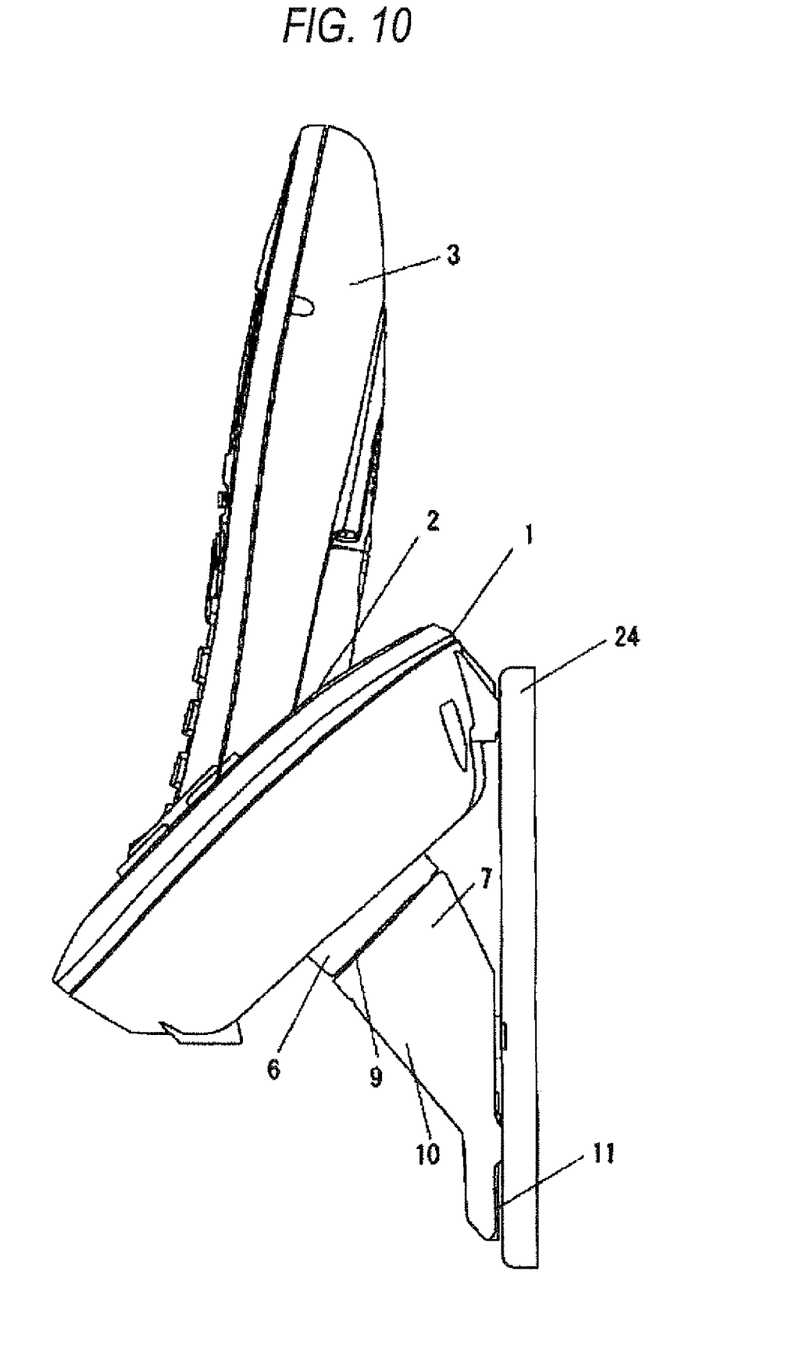
FIG. 10 is a side view of the telephone apparatus acquired when the telephone apparatus is mounted on the wall.

FIG. 1 shows a state (a first turn position) achieved when the phone body 1 is mounted on a desk, and FIG. 10 shows a state (a second turn position) achieved when the phone body 1 is mounted on a wall. As is obvious from a comparison between FIG. 1 and FIG. 10, the supporting leg 7 is turned through about 180 degrees around the pivot 8 when the phone body 1 is mounted on the wall when compared with the case where the phone body 1 is mounted on the desk.

Figure 4:
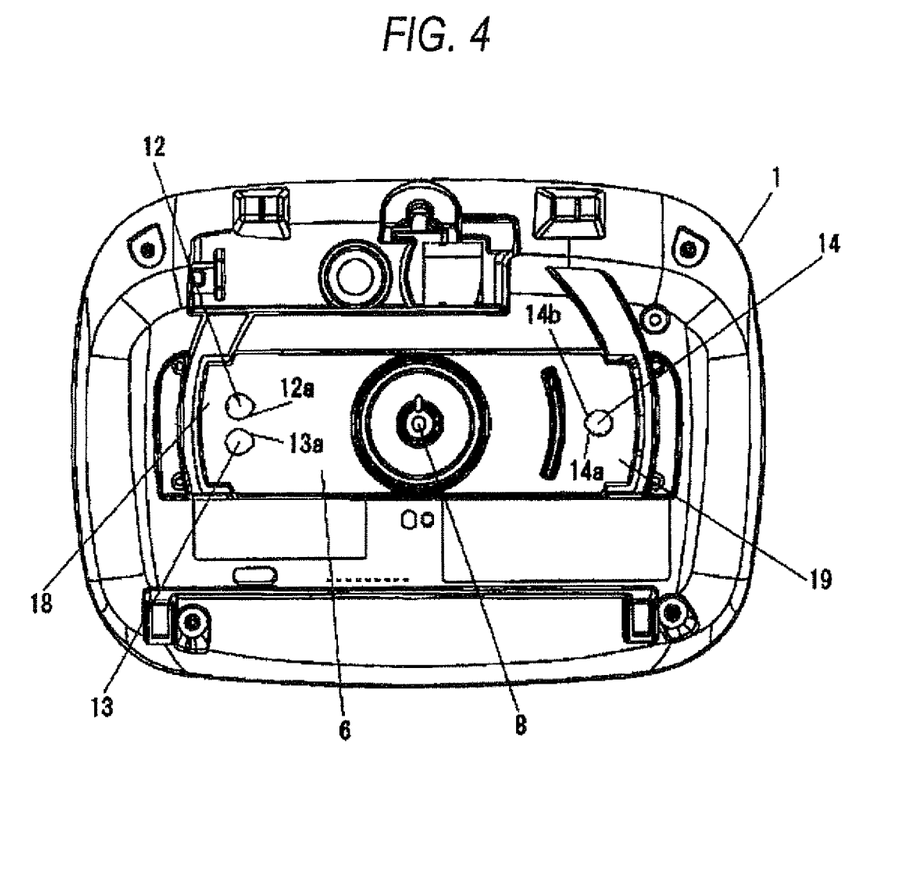
FIG. 4 is a bottom view of the phone body acquired when a supporting leg of the telephone apparatus is removed.
Figure 5:
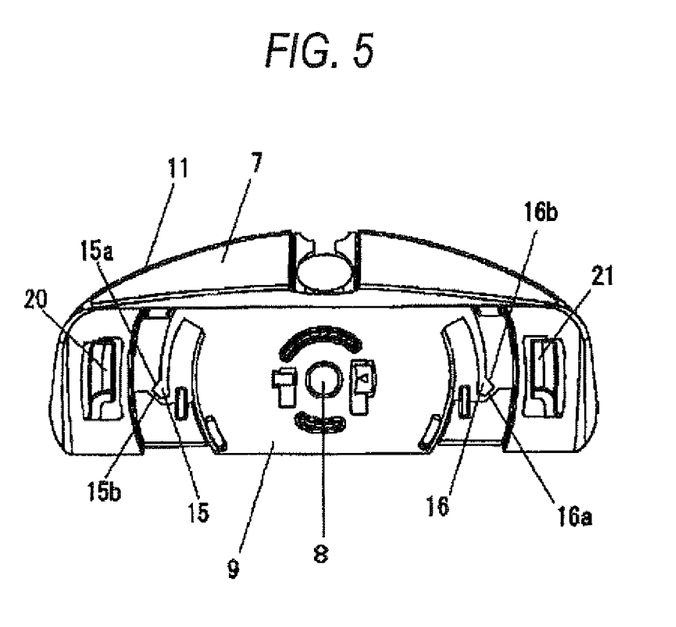
FIG. 5 is a plan view of a fitting surface of the supporting leg of the telephone apparatus.
Figure 11:
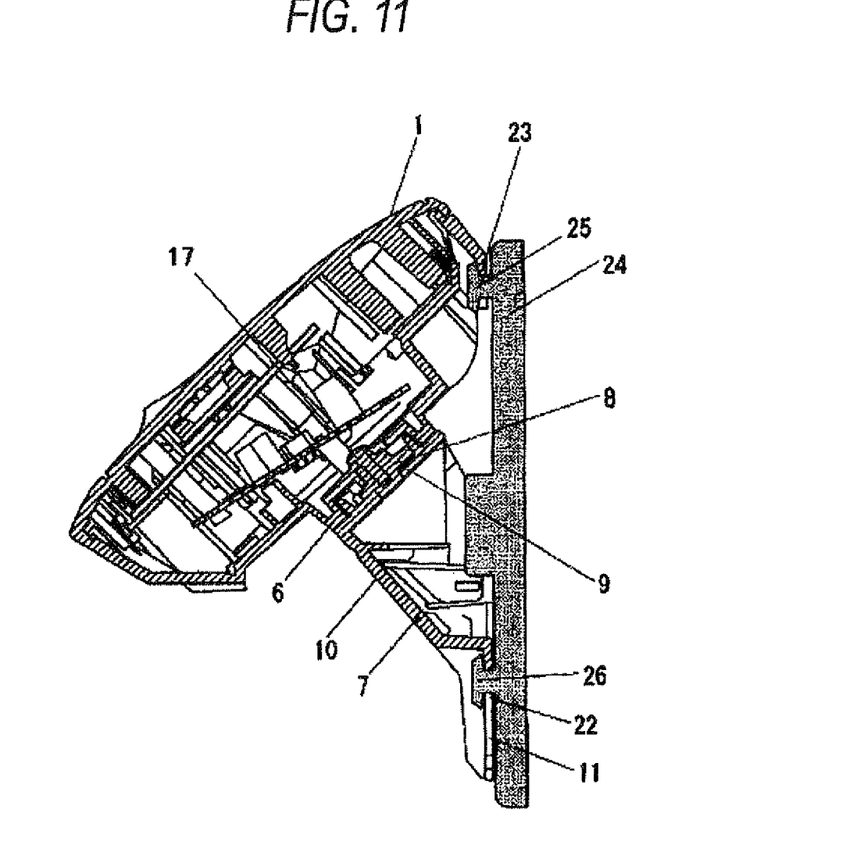
FIG. 11 is a cross sectional view of the telephone apparatus acquired when the telephone apparatus is mounted on the wall.

A basic structure of the supporting leg 7 is now described. FIG. 5 shows the supporting leg 7 viewed from above, and FIG. 4 shows the phone body 1 acquired when it is viewed from below with the supporting leg 7 taken off. As shown in FIG. 5, a fitting surface 9 is provided on a side of the supporting leg 7 that is oriented upward when the phone body 1 is mounted on the wall as shown in FIGS. 10 and 11 as well as when the phone body is mounted on the desk as shown in FIG. 1. Further, as shown in FIGS. 1 and 10, a middle portion of the supporting leg 7 is a pillar 10, and a mounting surface 11 is provided on a lower side of the pillar 10. The supporting leg 7 is attached to the supporting leg mounting section 6 of the phone body 1 while the fitting surface 9 is positioned opposite the sloped back side of the phone body 1, whereby the supporting leg 7 becomes turnable around the pivot 8 while facing the sloped back side of the phone body 1 with the pivot 8 positioned center.

As shown in FIG. 1, when the phone body 1 is mounted on the desk, the mounting surface 11 of the supporting leg 7 becomes substantially parallel to a lower end of the slope of the phone body 1. When the supporting leg 7 is turned through about 180 degrees from the position; namely, when the phone body 1 is mounted on the wall, the mounting surface 11 becomes substantially parallel to an upper end of the slope of the phone body 1, as shown in FIG. 10. The lower end of the slope is an area of the phone body 1 that contacts the desk when the phone body 1 is mounted on the desk (i.e., in the desk mount mode). Further, the upper end of the slope is an area of the phone body 1 that contacts the wall when the phone body 1 is mounted on the wall (i.e., in the wall mount mode). The sloped back side is an intermediate area between the lower end and the upper end of the slope.

A center line of the pivot 8 forms an angle of 45 degrees with respect to a horizontal surface (i.e., a bottom of the telephone apparatus when the phone body is mounted on the desk). The supporting leg 7 is turned around a line that forms an angle of 45 degrees with respect to the horizontal surface, thereby switching between the desk mount position and the wall mount position. Consequently, even when the phone body 1 is mounted on the desk as shown in FIG. 1 or even when the phone body 1 is mounted on the wall as shown in FIG. 10, the inclination of the phone body 1 remains substantially constant. Specifically, an angel that the pivot 8 forms with the mounting surface 11 formed on the supporting leg 7 is about 45 degrees. Accordingly, even when the phone body 1 is mounted on the desk as shown in FIG. 1 or even when the phone body 1 is mounted on the wall as shown in FIG. 10, the angle of the cradle port 2 of the phone body 1 remains substantially constant. In any case, the state of the earpiece 3 removably placed upright in the cradle port 2 remains substantially unchanged and stable. Therefore, even when placed upright in the cradle port 2 as mentioned above, the earpiece 3 will not inadvertently fall.

Moreover, even when the phone body 1 is mounted on the desk as mentioned above or when the phone body 1 is mounted on the wall, the earpiece 3 is placed upright in the cradle port 2 of the phone body 1. Hence, the earpiece 3 can easily be taken off or put in the cradle port 2, which provides the user with superior ease of use.

A structure for fixing turn of the supporting leg 7 is now described in detail.

As is understood from FIG. 4, engagement portions 12 and 13 are placed one one lateral side of the supporting leg mounting section 6 of the sloped back side of the phone body 1, and another engagement portion 14 is placed at the other lateral side of the same with the pivot 8 interposed therebetween. Specifically, the engagement portions 12 and 13 on one side and the engagement portion 14 on the other side are arranged symmetrically along the pivot 8 on the supporting leg mounting section 6. The engagement portion 14 is placed at a substantial center of the supporting leg mounting section 6 in its widthwise direction, whilst the engagement portions 12 and 13 are placed at both ends (a front position and a back position along a turning direction) with reference to the substantial center of the supporting leg mounting section 6 in its widthwise direction.

In the meantime, as is understood from FIG. 5, engagement claws 15 and 16 that engage with any of the engagement portions 12, 13, and 14 are provided one on each lateral side of the pivot 8 on the fitting surface 9 of the supporting leg 7. Specifically, the engagement claws 15 and 16 are provided at positions symmetrical about the pivot 8 on the fitting surface 9 of the supporting leg 7. The engagement claws 15 and 16 are extended from the substantial center of the fitting surface 9 toward one side with respect to the widthwise direction. Spring properties of the engagement claws 15 and 16 are enhanced as a result of the engagement claws 15 and 16 being extended in the manner as mentioned above.

As is understood from FIG. 4, planar engagement surfaces 12a and 13a are provided at positions facing the engagement portions 12 and 13 arranged side by side on the phone body 1. Further, planar engagement surfaces 14a and 14b that adjoin to each other at a predetermined angle are provided for the engagement portion 14.

As is understood from FIG. 5, planar engagement surfaces 15a and 15b that adjoin to each other at a predetermined angle are provided for the engagement claw 15 at positions where the planar engagement surfaces 15a and 15b collide with the engagement surface of the engagement portion 12 or the respective engagement surfaces of the engagement potions 13 and 14. Moreover, planar engagement surfaces 16a and 16b that adjoin to each other at a predetermined angle are provided for the engagement claw 16 at positions where the engagement surfaces 16a and 16b collide with the engagement surface of the engagement portion 12 or the respective engagement surfaces of the engagement portions 13 and 14.

Figure 6:
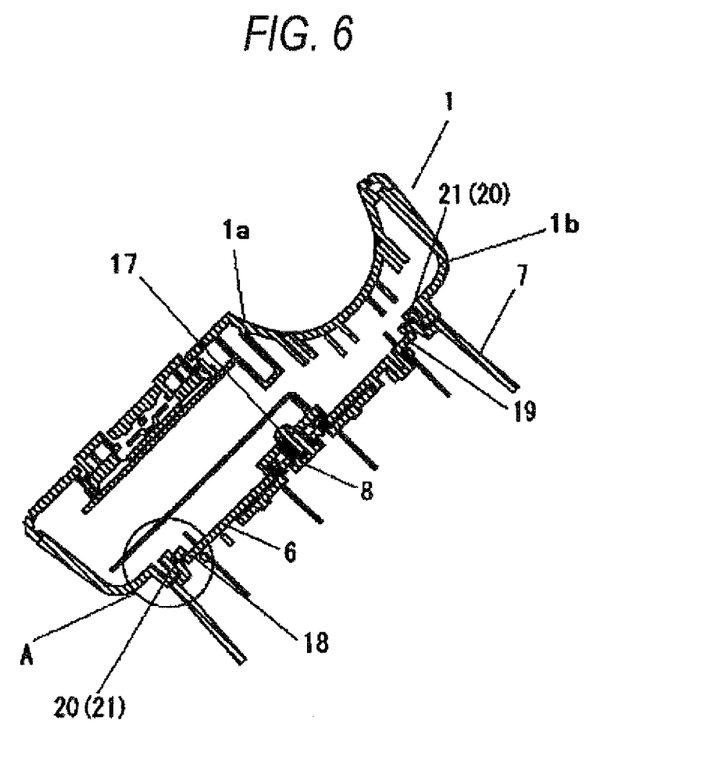
FIG. 6 is a cross sectional view of a principal block acquired when the telephone apparatus is cut along a plane where a center of turn of the supporting leg of the telephone apparatus runs.

As is understood from FIG. 6, the pivot 8 is fastened to the lower cabinet 1b of the phone body 1 from an interior surface side with a screw 17 before the upper cabinet 1a and the lower cabinet 1b of the phone body 1 are assembled together.

Guide flanges 18 and 19 are provided outside the engagement portions 12, 13, and 14 of the supporting leg mounting section 6 of the lower cabinet 1b of the phone body 1. Further, regulating flanges 20 and 21 that pass by, while sliding over, upper surface sides of the respective guide flanges 18 and 19 are provided outside of the engagement claws 15 and 16 on the fitting surface 9 of the supporting leg 7. Each of the regulating flanges 20 and 21 has a substantially-L-shaped cross-sectional profile.

Figure 3:
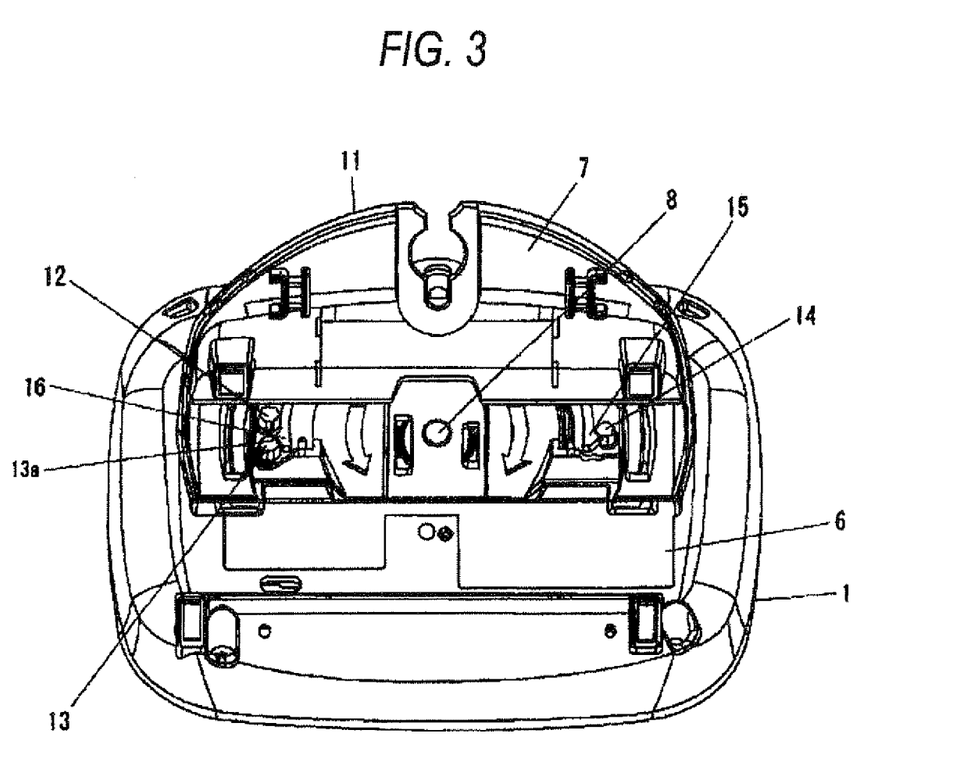
FIG. 3 is a bottom view of the telephone apparatus acquired when the telephone apparatus is mounted on the desk.

FIG. 3 shows a state in which the phone body 1 is mounted on the desk as shown in FIG. 1. When the phone body 1 shown in FIG. 3 is mounted on the desk, the engagement surface 16a of the engagement claw 16 (see FIG. 5) contacts the engagement surface 13a of the engagement portion 13, whereby the engagement portion 13 engages with the engagement claw 16. On the other side, the engagement surface 15a of the engagement claw 15 (see FIG. 5) contacts the engagement surface 14a of the engagement portion 14 (see FIG. 4), whereby the engagement portion 14 engages with the engagement claw 15. Turning action of the supporting leg 7 is stopped by means of engagement of the engagement portion 13 with the engagement claw 16 and engagement of the engagement portion 14 with the engagement claw 15, so that the position of the phone body 1 and the position of the supporting leg 7 achieved after turning are thus fixed.

Figure 7:
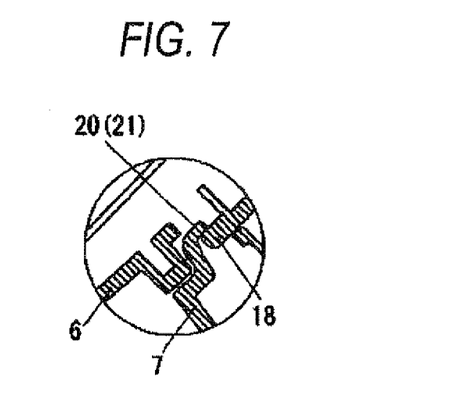
FIG. 7 is an enlarged cross sectional view of the principal block of the telephone apparatus (an enlarged cross sectional view of section A shown in FIG. 6).

In FIG. 3 (the desk mount mode), the regulating flange 20 engages with the guide flange 18, and the regulating flange 21 engages with the guide flange 19 as shown in FIGS. 6 and 7. FIG. 6 is a cross-sectional view of the principal block showing engagement of the guide flanges 18 and 19 of the phone body 1 with the regulating flange (20 or 21) of the supporting leg 7. FIG. 7 is an enlarged cross sectional view showing one of engaged portions where the guide flange is engaged with the regulating flange.

As is understood from FIGS. 6 and 7, the regulating flange 20 is engaged with the guide flange 18 in the desk mount mode, and the regulating flange 21 is engaged with the guide flange 19, thereby guaranteeing strength between the supporting leg 7 and the phone body 1.

Figure 8:
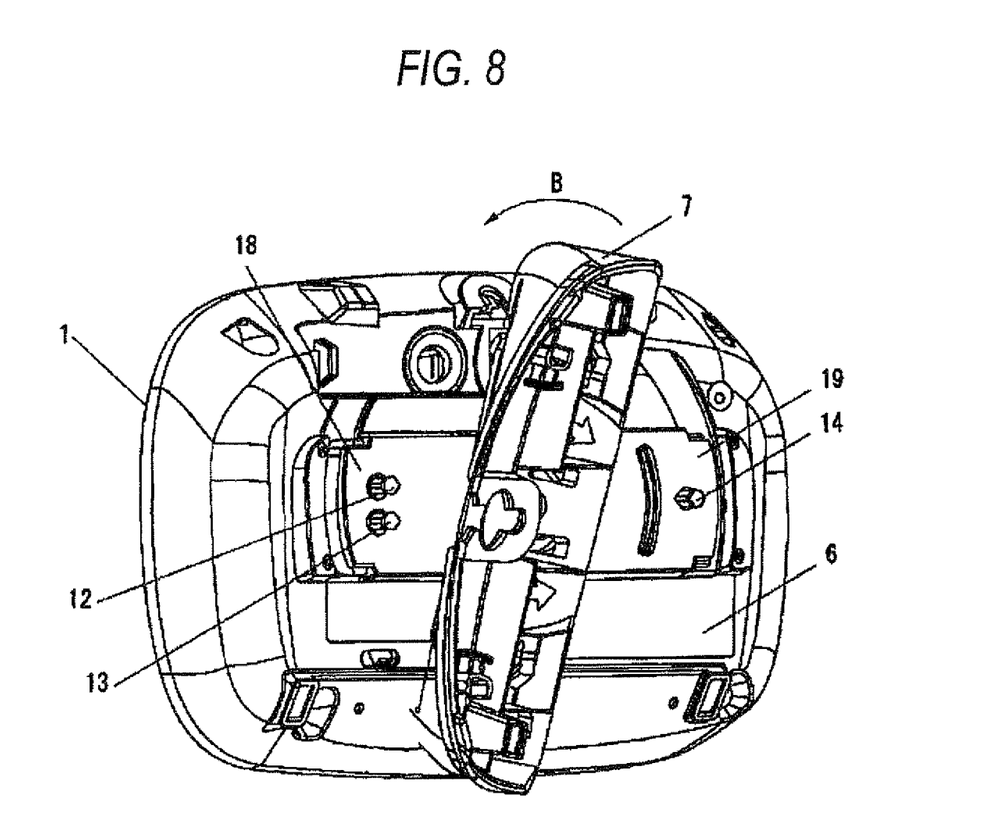
FIG. 8 is a bottom view showing the supporting leg of the telephone apparatus that is in the course of turning.
Figure 9:
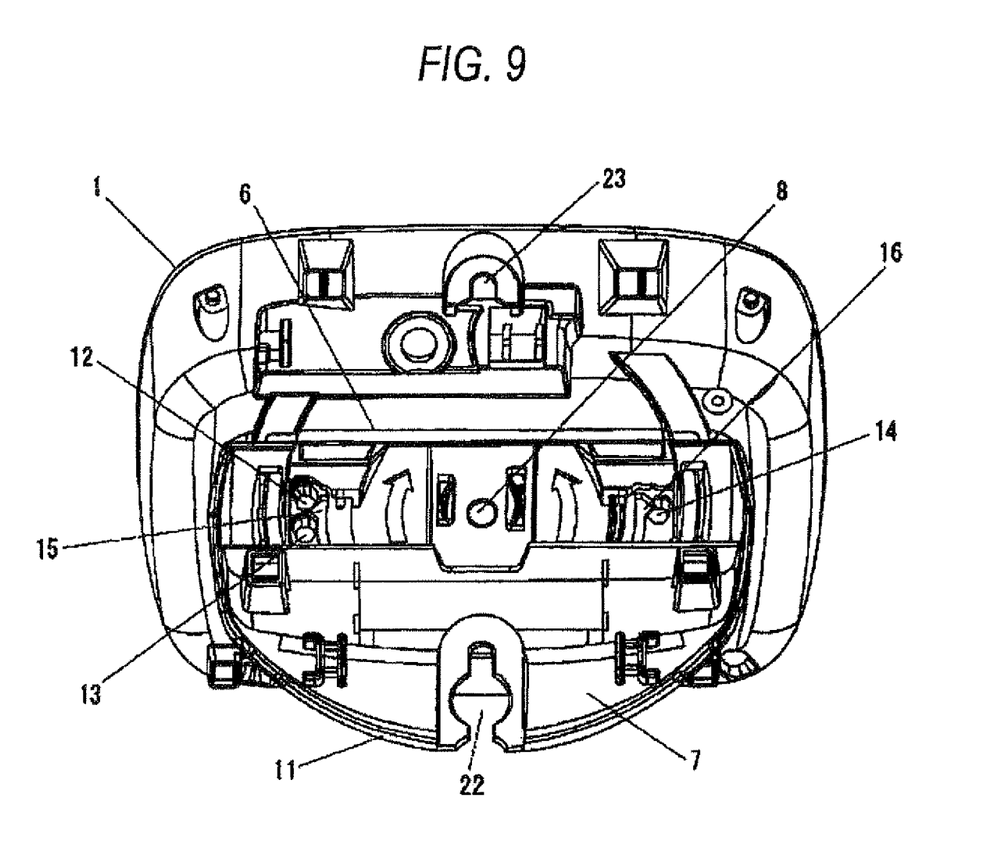
FIG. 9 is a rear view of the telephone apparatus acquired when the supporting leg of the telephone apparatus is turned so that the telephone apparatus can be mounted on the wall.

FIG. 8 shows a state of the supporting leg 7 that is in the course of turning around the pivot 8 in direction of arrow B in order to switch the phone body 1 from the desk mount mode to the wall mount mode. Specifically, when force is exerted on the supporting leg 7 in order to turn the supporting leg 7, the engagement surface 13a that is a sloped surface contacts the engagement surface 16a. The engagement claw 16 runs over the engagement portion 13 while sliding over the same, whereupon the engagement claw 16 is disengaged from the engagement portion 13. The supporting leg 7 then becomes turnable within a range of about 180 degrees. FIG. 9 shows that the supporting leg 7 has been turned around the pivot 8 through about 180 degrees in order to mount the phone body 1 on the wall.

When the supporting leg 7 is mounted on the wall as shown in FIG. 9, the engagement surface 15b of the engagement claw 15 (see FIG. 5) contacts the engagement surface 12a of the engagement portion 12 (see FIG. 4), whereby the engagement portion 12 is engaged with the engagement claw 15. The engagement surface 16b of the engagement claw 16 (see FIG. 5) contacts the engagement surface 14b of the engagement portion 14 (see FIG. 4), whereby the engagement portion 14 is engaged with the engagement claw 16. Turning action of the supporting leg 17 is hindered by engagement of the engagement portion 12 with the engagement claw 15 and engagement of the engagement portion 14 with the engagement claw 16.

As is understood from FIG. 8, when the supporting leg 7 is turned in order to switch from the desk mount mode to the wall mount mode, the regulating flange 20 (see FIG. 6) departs from the guide flange 18. The regulating flange 21 (see FIG. 6) departs from the guide flange 19. When the state shown in FIG. 9 is achieved, the regulating flange 21 engages with the guide flange 18, and the regulating flange 20 engages with the guide flange 19. Neither the guide flange nor the regulating flange is illustrated in FIG. 9.

In FIGS. 6 and 7, reference numerals of the regulating flanges 20 and 21 are parenthesized. When the phone body 1 is switched from the desk mount mode to the wall mount mode by turning the supporting leg 7 through 180 degrees, the regulating flange 21 engages with the guide flange 18, and the regulating flange 20 engages with the guide flange 19. Both the guide flanges and the regulating flanges are engaged as described in the case of the previously-described desk mount mode, whereby strength between the supporting leg 7 and the phone body 1 is assured.

As shown in FIG. 11, in this state, an engagement notch 22 formed in the mounting surface 11 in a lower portion of the supporting leg 7 and an engagement notch 23 formed in the upper end of the slope of the phone body 1 come into presence within the same plane. The engagement notches 22 and 23 are engaged with projections 25 and 26 of a wall-mounting unit 24 serving as mounting hardware on the wall, whereby installing the phone body 1 on the wall is completed as shown in FIG. 10.

Although the present invention has been described in detail by reference to the specific embodiment, it is manifest to those skilled in the art that the present invention be susceptible to various alterations or modifications without departing the spirit and scope of the present invention.

The present patent application is based on Japanese Patent Application (JP-2009-201511) filed on Sep. 1, 2009, the entire subject matter of which is incorporated herein by reference.

INDUSTRIAL APPLICABILITY

As mentioned above, in the present invention, the telephone apparatus includes the phone body that is mounted at an inclination and that has the cradle port formed in the sloped front side of the phone body and the supporting leg mounting section provided on the sloped back side of the same, the earpiece removably placed upright in the cradle port of the phone body, and the supporting leg provided on the supporting leg mounting section of the phone body so as to be turnable around the pivot. The supporting leg has the fitting surface that turns around the pivot while facing the sloped back side of the phone body and the mounting surface that becomes substantially parallel to the lower end face of the slope of the phone body in the first turn position of the fitting surface and that becomes substantially parallel to the upper end of the slope of the phone body in the second turn position achieved after a turn of about 180 degrees from the first turn position. Accordingly, superior ease of use is provided.

Specifically, in the present invention, the supporting leg has the fitting surface that turns around the pivot while facing the sloped back side of the phone body and the mounting surface that becomes substantially parallel to the lower end face of the slope of the phone body in the first turn position of the mounting surface and that become substantially parallel to the upper end of the slope of the phone body in the second turn position achieved after a turn of about 180 degrees from the first turn position. The single mounting surface remains in contact with the desk or the wall even when the telephone apparatus is mounted on the desk or the wall.

Therefore, the state of the cradle port of the phone body becomes stable even when the telephone apparatus is mounted on the desk or the wall, the earpiece can be placed upright in the cradle port of the phone body. Ease of use of the telephone apparatus becomes consequently improved.

Therefore, enhanced utilization of the phone apparatus is expected.

DESCRIPTIONS OF THE REFERENCE NUMERALS AND SYMBOLS

1 PHONE BODY
2 CRADLE PORT
3 EARPIECE
4 SPEAKER GRILL
5 OPERATION SECTION
6 SUPPORTING LEG MOUNTING SECTION
7 SUPPORTING LEG
8 PIVOT
9 FITTING SURFACE
10 PILLAR
11 MOUNTING SURFACE
12, 13, 14 ENGAGEMENT PORTION
12a, 13a, 14a, 14b, 15a, 15b, 16a, 16b ENGAGEMENT SURFACE
15, 16 ENGAGEMENT CLAW
17 SCREW
18, 19 GUIDE FLANGE
20, 21 REGULATING FLANGE
22, 23 ENGAGEMENT NOTCH
24 WALL-MOUNTING UNIT
25, 26 PROJECTION

The invention claimed is:
1. A telephone apparatus comprising:
a phone body that has a cradle port formed in a sloped front side of the phone body to charge a battery in an earpiece, a lower end of a slope which contacts a horizontal surface when the phone body is mounted in a horizontal surface mount mode, an upper end of the slope which contacts a vertical surface when the phone body is mounted in a vertical surface mount mode, and a supporting leg mounting section provided on a sloped back side between the lower end and the upper end of the slope; and
a supporting leg that is placed on the supporting leg mounting section of the phone body so as to be turnable around a pivot, wherein
the pivot is oriented in a perpendicular direction relative to the surface of the sloped back side;
the supporting leg has a mounting surface that becomes substantially parallel to the lower end face of the slope of the phone body in the horizontal surface mount mode and that becomes substantially parallel to the upper end face of the slope of the phone body in the vertical surface mount mode, the angle of the cradle port of the phone body remaining substantially constant regardless of whether the phone body is in the horizontal surface mount mode or in the vertical surface mount mode.

2. The telephone apparatus according to claim 1, wherein an angle which the pivot forms with the mounting surface formed on the supporting leg is about 45 degrees.

3. The telephone apparatus according to claim 1, wherein an engagement portion is provided on either the supporting leg mounting section on the sloped back side of the phone body or a fitting surface of the supporting leg opposing the supporting leg mounting section, and an engagement claw that engages with the engagement portion is provided on a remaining one.

4. The telephone apparatus according to claim 3, wherein the pair of engagement claws are provided at positions on the fitting surface of the supporting leg that are symmetrical about the pivot.

5. The telephone apparatus according to claim 4, wherein the engagement portions that can engage with the engagement claw are provided at positions on the supporting leg mounting section of the phone body that are symmetrical about the pivot; and
a first engagement portion is provided at one position, and a second engagement portion and a third engagement portion are provided at the other position.

6. The telephone apparatus according to claim 5, wherein the engagement claws are engaged with the first engagement portion and the second engagement portion when the supporting leg is in the first turn position, and the engagement claws are engaged with the first engagement portion and the third engagement portion when the supporting leg is in the second turn position.

7. The telephone apparatus according to claim 3, wherein a regulating flange that has a substantially-L-shaped cross-sectional profile is provided on each of positions on both ends of the fitting surface of the supporting leg that are symmetrical about the pivot;
a guide flange that can engage with the regulating flange is provided at each of positions on the supporting leg mounting section of the phone body that are symmetrical about the pivot; and engagement of the first regulating flange with the first guide flange and engagement of the second regulating flange with the second guide flange are achieved when the supporting leg is in the first turn position, and engagement of the first regulating flange with the second guide flange and engagement of the second regulating flange with the first guide flange are achieved when the supporting leg is in the second turn position.

8. The telephone apparatus according to claim 1, wherein two engagement notches that are engaged with mounting hardware on a wall when the phone body is mounted on a wall are formed in the upper end of the slope of the phone body and the mounting surface of the supporting leg.

9. The telephone apparatus according to claim 1, wherein the mounting surface becomes substantially parallel to the lower end face of the slope of the phone body on the horizontal surface in the horizontal surface mount mode and becomes substantially parallel to the upper end face of the slope of the phone body on the vertical surface in the vertical surface mount mode.

* * * * *